US007953851B2

(12) United States Patent
Britton et al.

(10) Patent No.: US 7,953,851 B2
(45) Date of Patent: May 31, 2011

(54) METHOD AND APPARATUS FOR ASYMMETRIC INTERNET TRAFFIC MONITORING BY THIRD PARTIES USING MONITORING IMPLEMENTS

(75) Inventors: Zachary Edward Britton, Toulumne, CA (US); Derek Stephen Maxson, Twain Harte, CA (US); Brian Mathew Blocher, Oakdale, CA (US); Thabo Husayn Fletcher, Sonora, CA (US); Scott Kenneth Smith, Modesto, CA (US); Carlos Alberto Vazquez, Chula Vista, CA (US)

(73) Assignee: Front Porch, Inc., Sonora, CA (US)

( * ) Notice: Subject to any disclaimer, the term of this patent is extended or adjusted under 35 U.S.C. 154(b) by 162 days.

(21) Appl. No.: 12/340,640

(22) Filed: Dec. 19, 2008

(65) Prior Publication Data
US 2009/0157875 A1    Jun. 18, 2009

Related U.S. Application Data

(63) Continuation-in-part of application No. 11/974,508, filed on Oct. 12, 2007.

(60) Provisional application No. 60/928,281, filed on Jul. 13, 2007.

(51) Int. Cl.
*G06F 13/00* (2006.01)
(52) U.S. Cl. .................. 709/224; 709/238; 709/239
(58) Field of Classification Search .................. 709/224, 709/238, 239
See application file for complete search history.

(56) References Cited

U.S. PATENT DOCUMENTS

| 5,761,673 | A | 6/1998 | Bookman et al. |
| 6,233,618 | B1 | 5/2001 | Shannon |
| 6,393,479 | B1 | 5/2002 | Glommen et al. |
| 6,438,125 | B1 * | 8/2002 | Brothers ..................... 370/352 |
| 7,039,699 | B1 | 5/2006 | Narin et al. |
| 7,260,697 | B2 * | 8/2007 | Okada ........................ 711/166 |
| 7,620,697 | B1 * | 11/2009 | Davies ........................ 709/217 |
| 7,779,103 | B1 | 8/2010 | Fikes et al. |
| 2001/0032139 | A1 | 10/2001 | Debonnett |
| 2001/0055274 | A1 | 12/2001 | Hegge et al. |
| 2002/0116531 | A1 | 8/2002 | Chu |
| 2002/0120666 | A1 | 8/2002 | Landsman et al. |

(Continued)

FOREIGN PATENT DOCUMENTS

WO    2009011728 A2    1/2009

(Continued)

OTHER PUBLICATIONS

International Search Report; PCT/US2008/005741; Sep. 5, 2008.

(Continued)

*Primary Examiner* — Kenneth R Coulter
(74) *Attorney, Agent, or Firm* — Robroy R. Fawcett (57) ABSTRACT

Disclosed is an internet traffic monitoring method. In the method, copied packets that are based on original packets sent from a user client are monitored for a web content request meeting certain monitoring selection criteria. Upon detection of a copied packet having a web content request meeting the selection criteria, a replacement packet is forwarded to the user client such that the user client receives the replacement packet before receiving a response packet from a target server of the corresponding original packet, wherein the replacement packet has a redirection with a fabricated web content request to a monitoring web page including at least one monitoring implement.

25 Claims, 11 Drawing Sheets

U.S. PATENT DOCUMENTS

| | | |
|---|---|---|
| 2003/0050863 A1 | 3/2003 | Radwin |
| 2003/0115546 A1 | 6/2003 | Dubey et al. |
| 2004/0073533 A1 | 4/2004 | Mynarski et al. |
| 2004/0122943 A1 | 6/2004 | Error et al. |
| 2005/0015429 A1 | 1/2005 | Ashley et al. |
| 2005/0216421 A1 | 9/2005 | Barry et al. |
| 2005/0257250 A1 | 11/2005 | Mitchell et al. |
| 2006/0136524 A1 | 6/2006 | Wohlers et al. |
| 2006/0174327 A1 | 8/2006 | Song et al. |
| 2006/0288096 A1 | 12/2006 | Yim |
| 2007/0245137 A1 | 10/2007 | Bhagat et al. |
| 2008/0052392 A1 | 2/2008 | Webster et al. |
| 2008/0126446 A1 | 5/2008 | Brunet et al. |
| 2008/0126567 A1 | 5/2008 | Wilson |
| 2008/0222283 A1 | 9/2008 | Ertugrul et al. |
| 2009/0019148 A1* | 1/2009 | Britton et al. ............ 709/224 |
| 2009/0030774 A1 | 1/2009 | Rothschild et al. |
| 2009/0077163 A1* | 3/2009 | Ertugrul et al. .......... 709/203 |
| 2009/0080421 A1 | 3/2009 | Ou |
| 2009/0099931 A1 | 4/2009 | Aaltonen et al. |
| 2009/0113532 A1 | 4/2009 | Lapidous |
| 2009/0177771 A1* | 7/2009 | Britton et al. ............ 709/224 |
| 2009/0216882 A1* | 8/2009 | Britton et al. ............ 709/224 |
| 2009/0254971 A1 | 10/2009 | Herz et al. |
| 2009/0293018 A1 | 11/2009 | Wilson et al. |
| 2010/0024032 A1 | 1/2010 | Britton et al. |
| 2010/0306052 A1 | 12/2010 | Britton et al. |

FOREIGN PATENT DOCUMENTS

| | | |
|---|---|---|
| WO | 2010011449 A1 | 1/2010 |
| WO | 2010128213 A1 | 3/2010 |

OTHER PUBLICATIONS

Written Opinion of International Search Report; PCT/US2008/005741; Sep. 5, 2008.

International Search Report; PCT/US2010/020670; Mar. 9, 2010.

Written Opinion of International Search Report; PCT/US2010/020670; Mar. 9, 2010.

Written Opinion of International Search Report; PCT/US2009/047709; Jul. 31, 2009.

* cited by examiner

| User | Participate in Tracking? | Location | Attribute |
|---|---|---|---|
| Juan Smith | Yes | Los Angeles, CA | Wifi |
| Sally Rodriguez | No | New York, NY | |
| 12.123.25.25 | No | Sacramento, CA | |
| 00-13-AA-BB-CC | Yes | | |
| 000130-26-58396-3268 | Yes | | |
| Jen Perla | Yes | Miami, FL | Wifi |

| Web Page | Eligible for Insertion? |
|---|---|
| www.yahoo.com | Yes |
| www.espn.com | No |
| *.edu | No |
| www.whitehouse.gov | Yes |

| Web Bug Location |
| --- |
| www.adserver1.com/webbug |
| www.adserver2.com/webbug |
| www.adserverN.com/webbug |
| www.itm1.com/webbug |
| www.itm2.com/webbug |
| www.itm3.com/webbug |

FIG. 10

Interstitial Format: ⸺ 1000

| | |
|---|---|
| <HTML> | 1010 |
| ... | 1020 |
| ... | 1021 |
| ... | 1022 |
| Web Bug 1 | 1030 |
| Web Bug 2 | 1031 |
| Web Bug 3 | 1032 |
| ... | 1033 |
| Web Bug N | 1034 |
| ... | 1035 |
| Call for Original URL | 1040 |
| </HTML> | 1050 |

HTML Modification Format: ⸺ 1005

| | |
|---|---|
| <HTML> | 1060 |
| Original Web Page HTML | 1070 |
| ... | 1071 |
| Web Bug 1 | 1080 |
| Web Bug 2 | 1081 |
| Web Bug 3 | 1082 |
| ... | 1083 |
| Web Bug N | 1084 |
| ... | 1085 |
| </HTML> | 1090 |

FIG. 12

METHOD AND APPARATUS FOR ASYMMETRIC INTERNET TRAFFIC MONITORING BY THIRD PARTIES USING MONITORING IMPLEMENTS

CROSS-REFERENCE TO RELATED APPLICATION

This application is a continuation-in-part of application Ser. No. 11/974,508, filed Oct. 12, 2007, and which claims the benefit of U.S. Provisional Application No. 60/928,281, having an assigned filing date of Jul. 13, 2007, which applications are incorporated herein by reference.

BACKGROUND OF THE INVENTION

1. Field of the Invention

The present invention relates to internet traffic monitoring, and more particularly, to a method for using monitoring implements to encompass a wide range of internet traffic.

2. Description of the Prior Art and Related Information

Many Web sites are financially supported by online advertising. Some Web sites sell their own advertisements (ads) and many use, for at least a portion of their advertising inventory, third party ad sales companies known commonly as Advertising Networks (AN). For ease of reference, both types (those who sell their own ads and those who use third party ad sales companies) will be referred to herein as ANs. The profitability of many Web sites is chiefly driven by the success, or failure, of the AN at selling the Web sites' ad inventory at the highest possible rate.

Run of Network (RON) advertisements are served indiscriminately to all Internet users who visit Web sites. These RON advertisements tend to earn much lower revenues per ad shown than their more targeted counterparts. This targeting can include location, user interests and other profile data.

To increase the value of the ad inventory, ANs generally use Web bugs and Cookies to track individual users and make it possible to target individual ads. A Web bug may be a small (typically 1×1 pixel) transparent GIF image (or other image of the same color as the background) that is embedded in an HTML page, such as a Web page. When a Web page is opened, the Web bug image is downloaded from the server storing it, allowing for monitoring of the Web page's viewing or usage. A Web bug may also use HTML, iframe, style, script, input link, embed, object or other tags to track usage.

When an Internet user navigates to a Web page that has ad inventory under AN management, the AN serves a Web bug. While a Web bug on an individual page has limited utility, ANs that have relationships with large numbers of Web sites can serve their Web bugs on many Web sites. By cross-referencing the traffic from multiple Web sites, the AN can begin profiling the Internet user and provide higher value advertising that is more highly targeted to the individual Internet user's interest. Therefore, a primary concern or goal for many ANs is to increase the distribution of their Web bug to as many sites as possible.

Further investigation showed that ANs have largely been left out of the value cycle created by search engines. Search engines are able to derive important profile information from their users' Internet searches. They then monetize this profile information by showing ads that match this profile. For example, someone searching for a hybrid automobile on a search engine could see ads for Toyota Prius® vehicles instead of a relatively low-value RON advertisement. Without the ability to place their Web bug on major search engine sites, AN are unable to tap this valuable profile information.

Finally, the Network Service Providers (NSP), such as ISPs, corporations, educational institutions, municipal wireless networks, etc., are not able to monetize their users' valuable profile information. While they may know the location of their users, they are unable to easily provide this information to ANs. Moreover, many NSPs do not profile their users' traffic and thus are not able to provide this information to ANs.

Attempts to bridge the gap between ANs and NSPs have typically fallen into two categories: 1) Swapping out RON ads with more targeted ads, or 2) modifying Web requests made to ANs to include additional profile information that will enable the ANs to serve more targeted advertisements. Both approaches require the use of a device, such as a proxy server, or its equivalent, to modify the HTTP request to enable the switching of the original Web requests to ANs. Moreover, both approaches require monitoring the NSP's user traffic. Two major problems of these approaches are that they require extensive NSP monitoring and, perhaps even more difficult, require detailed technical interaction between NSPs and ANs.

Internet Traffic Measurement (ITM) companies face a different challenge. Companies such as Nielsen Net Ratings have client-side monitoring software installed on thousands of computers so that they can derive statistics that can be applied to the Internet populace in general in order to understand global trends. Other ITM companies have devices installed at central points on the Internet in order to gather data for the development of trend information. Such solutions use the data to find broad trends rather than individual behavioral data about Internet users and thus are unable to provide specific criteria for the placement of targeted content and advertising. Other ITM companies have other approaches, but use relatively small samples to represent the much larger Internet population.

Some existing network appliances are capable of inserting web bugs in a symmetric fashion. These appliances must be positioned as a proxy in the network which may induce excessive latency and overhead as these proxy appliances must maintain TCP state information on packets. In addition, many networks employ asymmetric routing which restricts the ability for proxy appliances to be deployed.

There is, therefore, a need for a method and apparatus which enables ANs or ITM companies to more easily monitor Web traffic generated by users surfing on the Internet and to effectively communicate this data to the ANs. The present invention provides the methods and apparatuses to meet these needs.

SUMMARY OF THE INVENTION

The present invention may be embodied in an internet traffic monitoring method. In the method, copied packets that are based on original packets sent from a user client are monitored for a web content request meeting certain monitoring selection criteria. Upon detection of a copied packet having a web content request meeting the selection criteria, a replacement packet is forwarded to the user client such that the user client receives the replacement packet before receiving a response packet from a target server of the corresponding original packet, wherein the replacement packet has a redirection with a fabricated web content request to a monitoring web page including at least one monitoring implement.

In more detailed features of the invention, the web content request meeting the selection criteria may include search terms directed to an internet search engine, and the monitoring implement may cause the user client to forward the search terms to an associated advertisement selection service. The monitoring web page may include at least two monitoring implements which are each associated with a separate advertisement selection service. The monitoring implements may comprise at least first and second web bugs. The first web bug may be referenced with a URL having embedded parameters related to the user associated with the user client. Alternatively, the monitoring implements may comprise at least first and second cookies.

In other more detailed features of the invention, the monitoring implements may comprise a web bug associated with a first advertisement selection service, and a cookie associated with a second advertisement selection service. An advertisement selection service may select targeted advertising web content for presentation by the user client based on at least one parameter from a monitoring implement included in a monitoring web page presented as a result of traffic monitoring by a network service provider. Also, an advertisement selection service may select targeted advertising web content for presentation to the user client based on at least one parameter from a monitoring implement included in the monitoring web page which was presented as a result of traffic monitoring by a first network service provider, and based on at least one parameter from a monitoring implement included in another monitoring web page presented as a result of traffic monitoring by another network service provider in response to a separate web content request. The monitoring web page may be an interstitial web page forwarded by the network service provider.

The present invention also may be embodied in an internet traffic monitoring system. The system may have means for monitoring copied packets, that are based on original packets sent from a user client, for a web content request meeting certain monitoring selection criteria; and means for forwarding a replacement packet to the user client, upon detection of a copied packet having a web content request meeting the selection criteria, such that the user client receives the replacement packet before receiving a response packet from a target server of the corresponding original packet, wherein the replacement packet has a redirection with a fabricated web content request to a monitoring web page including at least one monitoring implement.

Alternatively, the present invention may be embodied in computer program product having computer readable medium including code for causing a computer to perform the method steps.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION

The present invention provides a new method for Advertising Network (AN) and Internet Traffic Measurement (ITM) companies to receive user web traffic data from Network Service Providers (NSPs). Web bugs may be used by AN and ITM companies to track the Web traffic activity of all the users from given NSPs rather than just small subsets. Many ANs use a series of channels and each web bug is the indicator that one or more criteria used in targeting advertising has been observed. Therefore, an advantageous function of the internet traffic monitoring technique of the invention may be to convert raw behavior into a series of single web bug transactions easily utilized by ANs.

The present invention enables NSPs to create and insert and/or modify web pages with AN and ITM Web bugs into their users' Web surfing sessions. The invention is placed on the NSP's network so that it can intercept an HTTP transaction, such as a Web page request, made by a user and either replace it with a customized Web page that includes Web bugs from participating AN and ITM companies, or modify the content of the web request to insert the necessary Web bugs from the participating AN and ITM companies. These modifications or replacements may be made to any objects including HTML, javascript, flash, images, audio, video or other media that are commonly served using the HTTP protocol. The originally requested Web page is then shown. In its simplest form, the customized Web page only provides the Web bugs with URL data from the originally requested Web page. In a more complex installation, it also modifies the URL, cookie, post, or query string, to include location and other information that the NSP knows about the user. In all cases, the inserted Web page is transparent to the user. The HTTP transaction may be intercepted during the request or response for the best effect.

The invention enables a NSP to elect to have only a portion of its users eligible for Web bug insertion. The NSP could, for example, opt to have only users accessing the Internet for free or at a discounted price be eligible for the Web bug insertion. The user database would then be updated per the grouping selected by the NSP.

After a user makes a Web page request, and the database shows that the user is eligible for Web bug insertion, then the Web page database is referenced to ascertain whether the requested web page is eligible for Web bugs. By only inserting Web bugs on certain pages, the NSP can minimize any induced latency caused by the insertion process. For example, a NSP could opt to only serve customized Web pages with Web bugs when the originally requested Web page was for a search engine.

If the user is eligible and the Web page is eligible, then the invention references the user database again to see if location data or other user attributes are known. If they are, then the customized Web page URL appends these parameters to the URL in order to transmit the information to the ANs and ITMs via their respective Web bugs.

The inserted Web page then forwards the user to the originally requested Web page. The inserted page is invisible to the user and should only induce nominal latency before the originally requested page is shown. The process will repeat itself for each Web page request that the user makes.

Also note that other companies could utilize their Web bugs in much the same fashion as the AN and ITM companies. For example, media companies could use Web bugs to determine what content would be of most interest to surfers who visit their Web sites.

The present invention relates generally to creating and inserting a web page with web bugs into the stream of web pages viewed by web users so that ANs and other third parties can extend the use and utility of their traffic monitoring tools to encompass a much wider range of web traffic.

Figure 2:
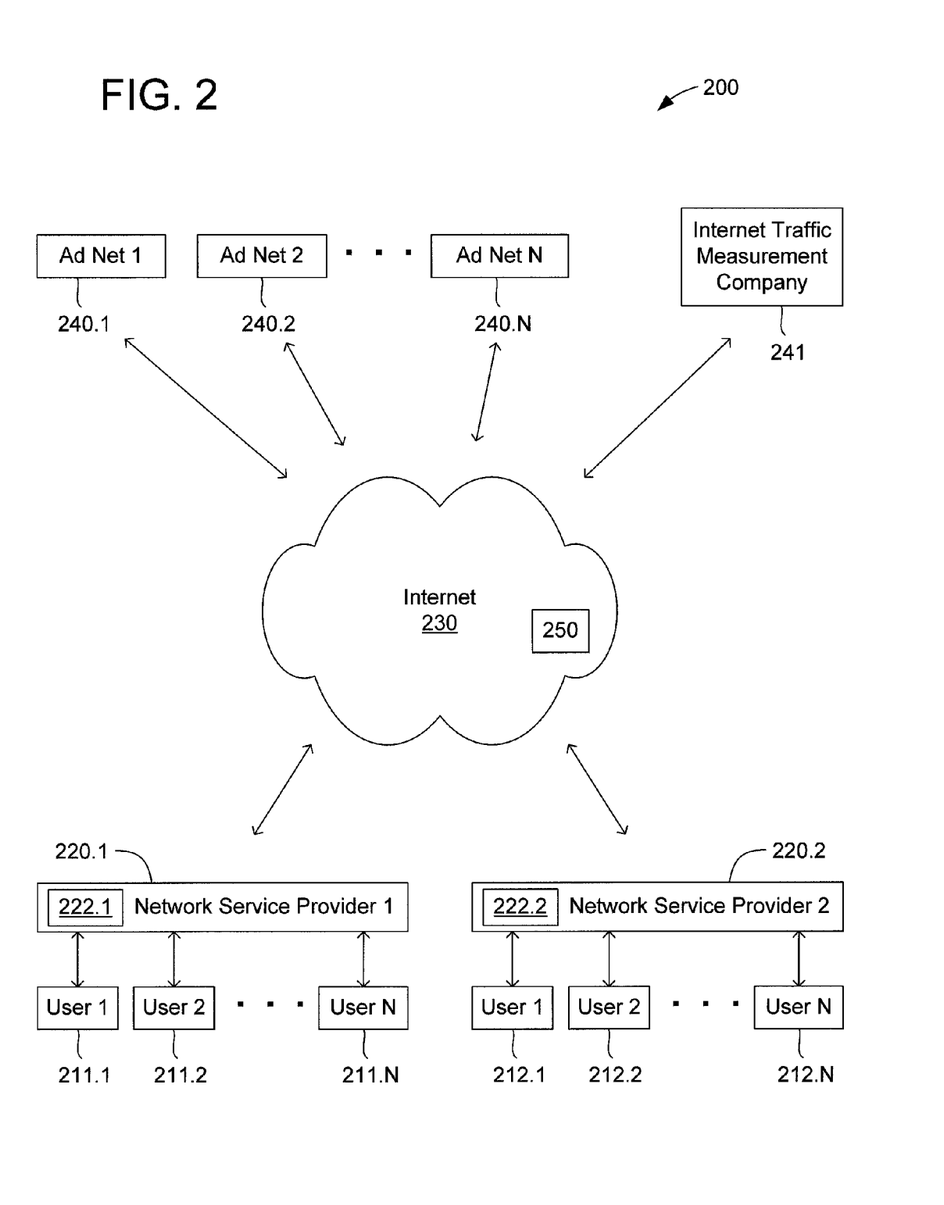
FIG. 2 depicts an exemplary network system, in which the present invention can function.

FIG. 2 depicts a block diagram illustrating an exemplary network 200, which includes one or more Internet users connected to the Internet via NSPs. The web site traffic of these users is monitored by one or more ANs and one or more ITM companies.

As shown in FIG. 2, the network 200 includes users 211.1-212.N, one or more NSPs 220.1-220.2, the Internet 230, and one or more advertising networks and TMCs 240.1-241. The Internet can connect a user to a myriad of web servers 250.

Figure 3:
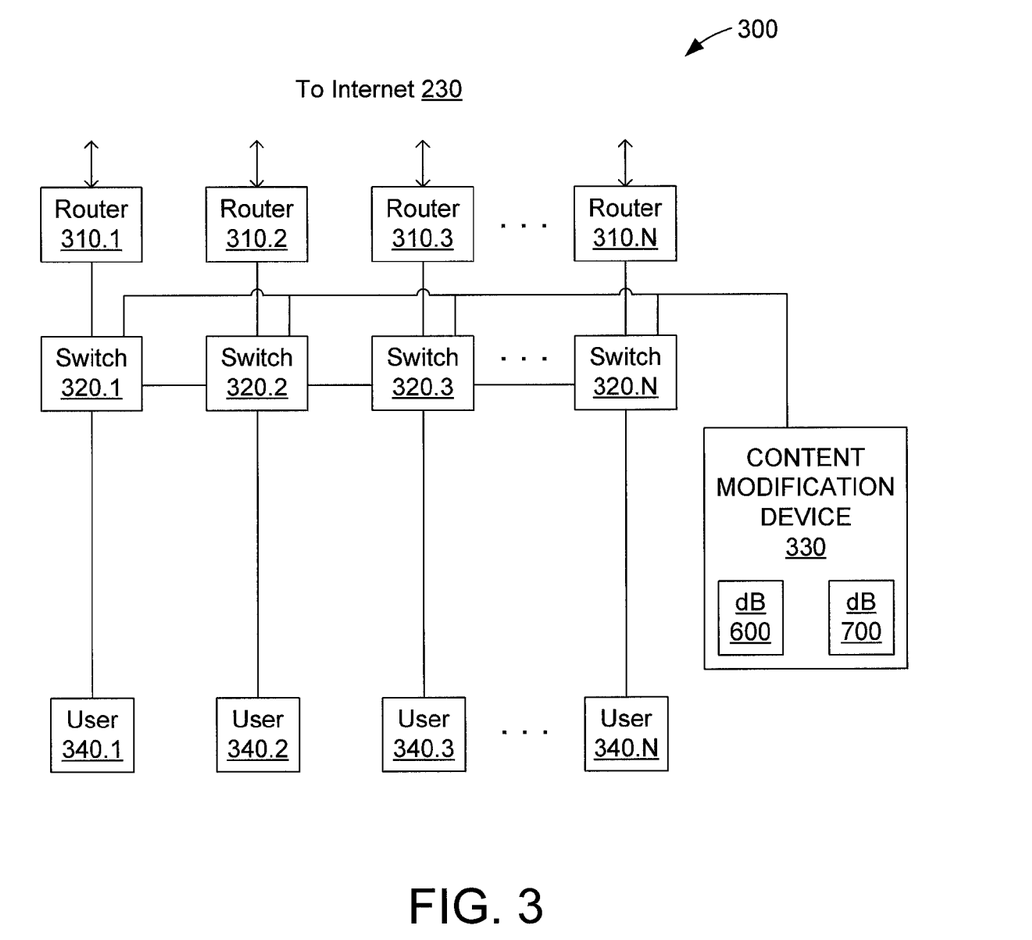
FIG. 3 depicts an exemplary network diagram for an asymmetrically routed network using a content modification device.

FIG. 3 shows a network diagram for an asymmetrically routed network 300 using a content modification device 330 according to the present invention. In describing FIG. 3, it is assumed that: 1) there are multiple routers 310 each with one or more connections to the Internet 230 and configured using an asymmetric method (in the asymmetric method, packets related to the same flow may exit the local network through any router and be received through any router); 2) a TCP flow may be routed though router 310.1 and proceed to the remote host and be received by router 310.3 (the switched network 320 will ensure that the packet reaches its intended destination); 3) there is a content modification device 330; and 4) the internet user generates a request for content from a remotely located server such as an HTTP request for a web page.

Figure 6:
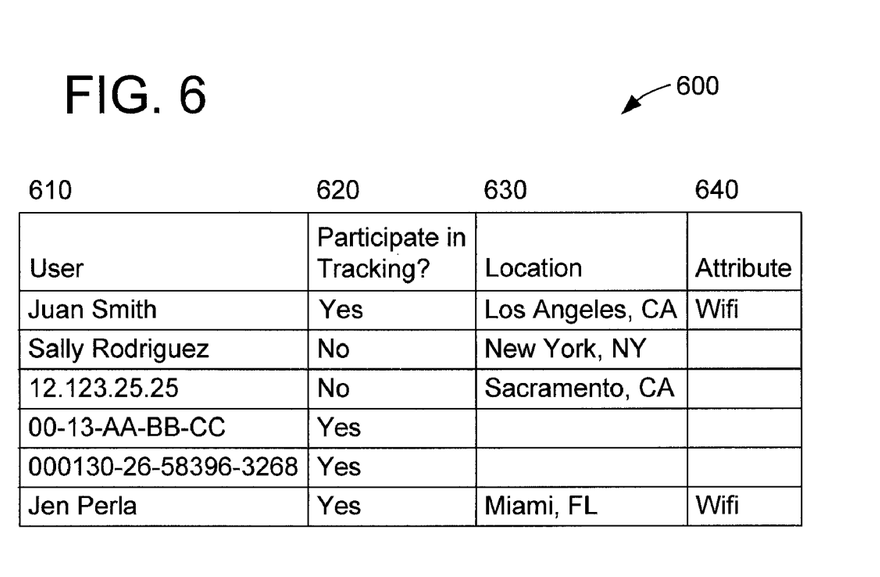
FIG. 6 depicts an exemplary user database for the present invention.

An internet user 340 requests a web page by selecting a domain in the web browser. The Computer's TCP stack constructs a series of packets sent to the switched network 320. A copy of these packets is sent to the content modification device 330 through port mirroring, a tap or other similar methodology. Packets sent to the content modification device may be filtered by a rule that requires them to be TCP packets with port 80 or other HTTP port as the destination port in the packet. Return packets from the internet 360 may be received by any router 310 and sent over any path to the user client 340, and these packets from the internet are not needed by the content modification device. The content modification device may include, or have access to, the domain database 700 (FIG. 7) and the user database 600 (FIG. 6).

Furthermore, the present invention allows all HTTP response traffic to be returned to the user computer or station 340 directly from web servers 250 through the service network 300, thereby inducing no additional latency for content sent by the web servers.

Research has shown that the HTTP traffic on a typical service network comprises approximately 50% of the total traffic. Further research has shown that approximately 5% of total HTTP traffic is TCP port 80 outbound from the service network, and approximately 95% of the total HTTP traffic is inbound response HTTP traffic. Thus, the present invention allows 97% of the traffic to have no increase in latency. The present invention also reduces the bandwidth costs of the data center network because 97% of the service network's internet traffic is not being handled by the data center network 330. Instead, 97% of the internet traffic is proceeding directly from the web sites to the user.

In order to perform the HTTP modification using only the outbound TCP port 80 traffic mirrored from the service provider 222, the present invention provides for the analysis of these packets, seeking to find HTTP requests such as GET and POST that represent a user's request for content from a web server 250. If the content modification device 330 identifies a HTTP request from a user requesting content from a web server, the request or the response may then be modified by the content modification device.

In a preferred embodiment, the outbound TCP port 80 traffic is delivered to the content modification device 330 through means of a mirror port or a tap which allows the network to continue at full speed because no latency is induced by the content modification device.

Advantageously, the content modification device 330 will modify the HTTP transaction by sending one or more packets directly to the originating computer and service network by taking on the IP address of the originally-requested web server 250. The new packet is destined to the originating computer on the service network and appears to be sent from the IP address of the web server. The TCP sequence value (SEQ) is the acknowledgement number from the packet containing the HTTP Request and the TCP acknowledgement value (ACK) is the SEQ of the packet containing the HTTP request plus the length of the TCP data in the spoof frame. The HTTP response in the application layer is a standard HTTP 302 redirection. The redirection can be made to any server containing any content that may be transmitted over HTTP. The content modification device performs this packet insertion very quickly so that the redirection packet arrives prior to the response from the web server.

Protocols in addition to HTTP can be handled by the modification device 330, such as XML, session initiation protocol (SIP), and other protocols using metadata.

Figure 1:
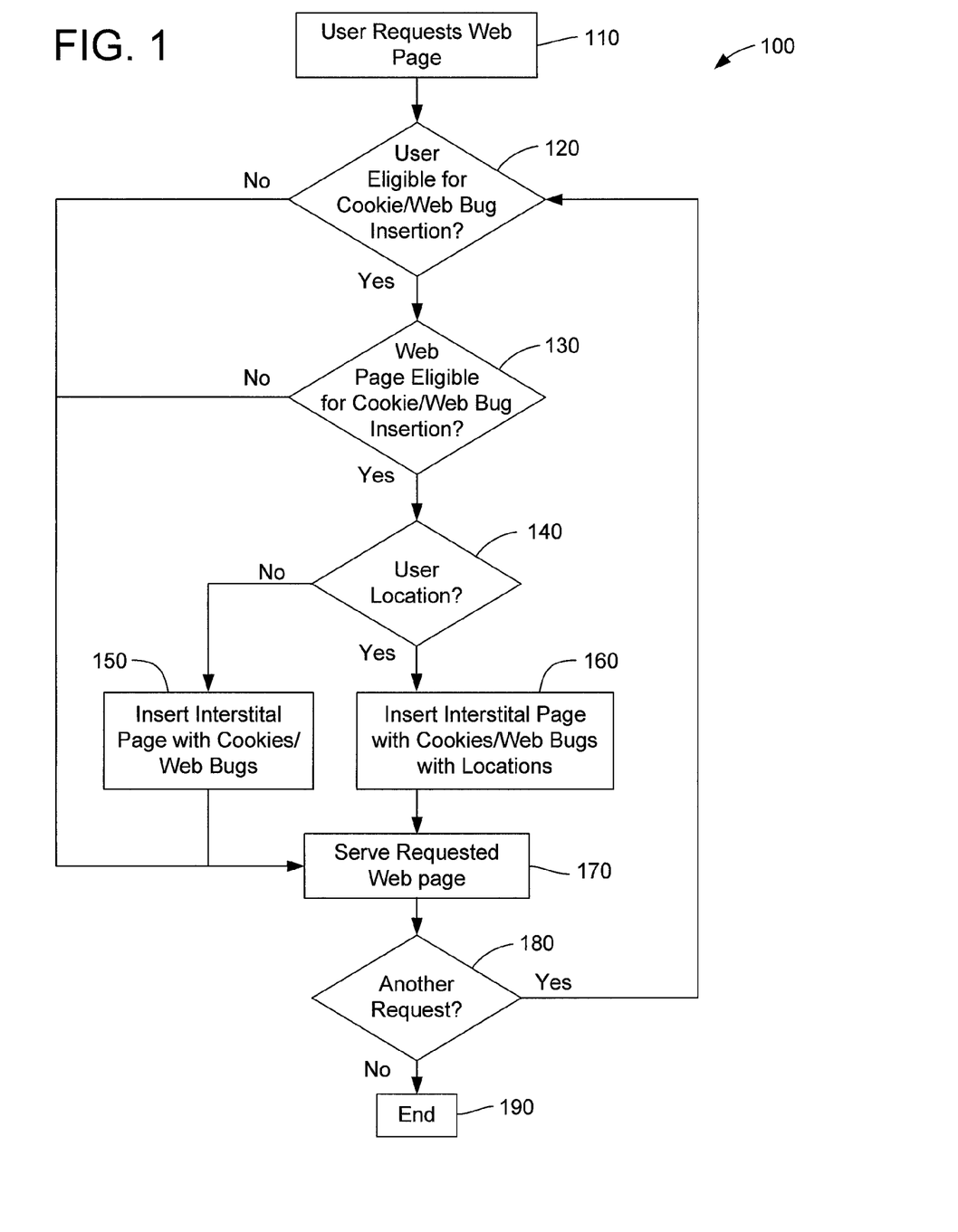
FIG. 1 depicts a flowchart illustrating the process of inserting web bugs or other tracking tools, in accordance with the present invention.

FIG. 1 depicts a flowchart illustrating the process 100 of inserting Web bugs or other tracking tools, in accordance with the present invention. In describing FIG. 1, it is assumed that: 1) The Internet user is connected to the Internet through an NSP 220 (as shown in FIG. 2) that utilizes the invention; and 2) one or more ANs, ITM servers, or other servers utilizing web bugs or other tracking tools (as shown in FIG. 2, 240.1-241) are participating.

In FIG. 1, the Internet user (which can be any one of the users shown in FIG. 2, 211.1 212.N) first establishes an Internet connection through a NSP (as shown in FIG. 2, 220.1 and 220.2). At step 110, the Internet user submits a HTTP (Web site) request.

At step 120, the application checks fields 610 and 620 in database 600, shown in FIG. 6, to see if the user is participating in the tracking. If the user is not participating, the user goes to step 170, and is served the originally requested Web page. If the user is participating in the Web bug insertion, then the user is moved to step 130. Note that steps 120, 130 and 140 can be conducted in alternative order. Also note that a simplified version of the invention can skip any of the steps 120-140 and simply serve interstitial pages with any available location parameters to all users on all pages.

Figure 7:
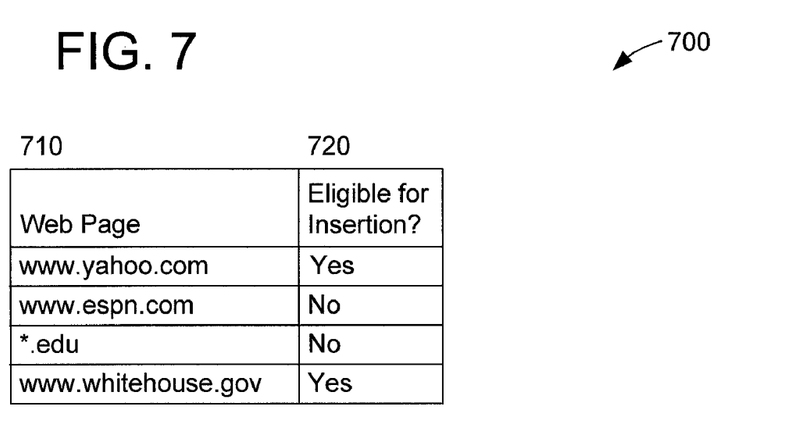
FIG. 7 depicts an exemplary Web page database for the present invention.

At step 130, the application checks fields 710 and 720 in database 700, shown in FIG. 7, to ascertain if the Web page requested in step 110 is a participating Web location. If it is, the user is moved to step 140. If it is not, the user is moved to step 170 and is served the originally requested Web page from step 110.

At step 140, the application checks fields 610 and 630 in database 600 to ascertain if a location parameter is known for the user. If it is, the user is moved to step 160. If it is not, the user is moved to step 150.

At step 150, the application inserts a Web page with Web bugs from participating ANs and ITM companies (FIG. 2, 240.1-241). The user is then moved to step 170.

At step 160, the application inserts a Web page with Web bugs from participating ANs and ITM companies (FIG. 2, 240.1-241). These Web bugs are modified to include the known location parameter found in FIG. 6, field 630. The user is then moved to step 170.

At step 170, the Web page originally requested by the user in step 110 (or step 180, if this is a subsequent iteration) is served. At step 180, if the user requests another Web page, the user is sent to step 120. If the user does not request another Web page, the session ends (step 190).

At step 190, the user is no longer requesting Web pages and there is no more interaction with the invention.

This flow chart could be modified so that the Web Bugs are inserted directly on the Requested Web Page. In this case, Steps 150 and 160 could be skipped and the Web bugs could be inserted directly onto the originally requested Web page. In such cases, user location and other attribute information would not be transmitted via the Web bugs. Alternatively, a framed Web page could be created with the Web bug inserted into one frame (which could be invisible to the user) and the originally requested Web page content in the other frame.

Figure 4:
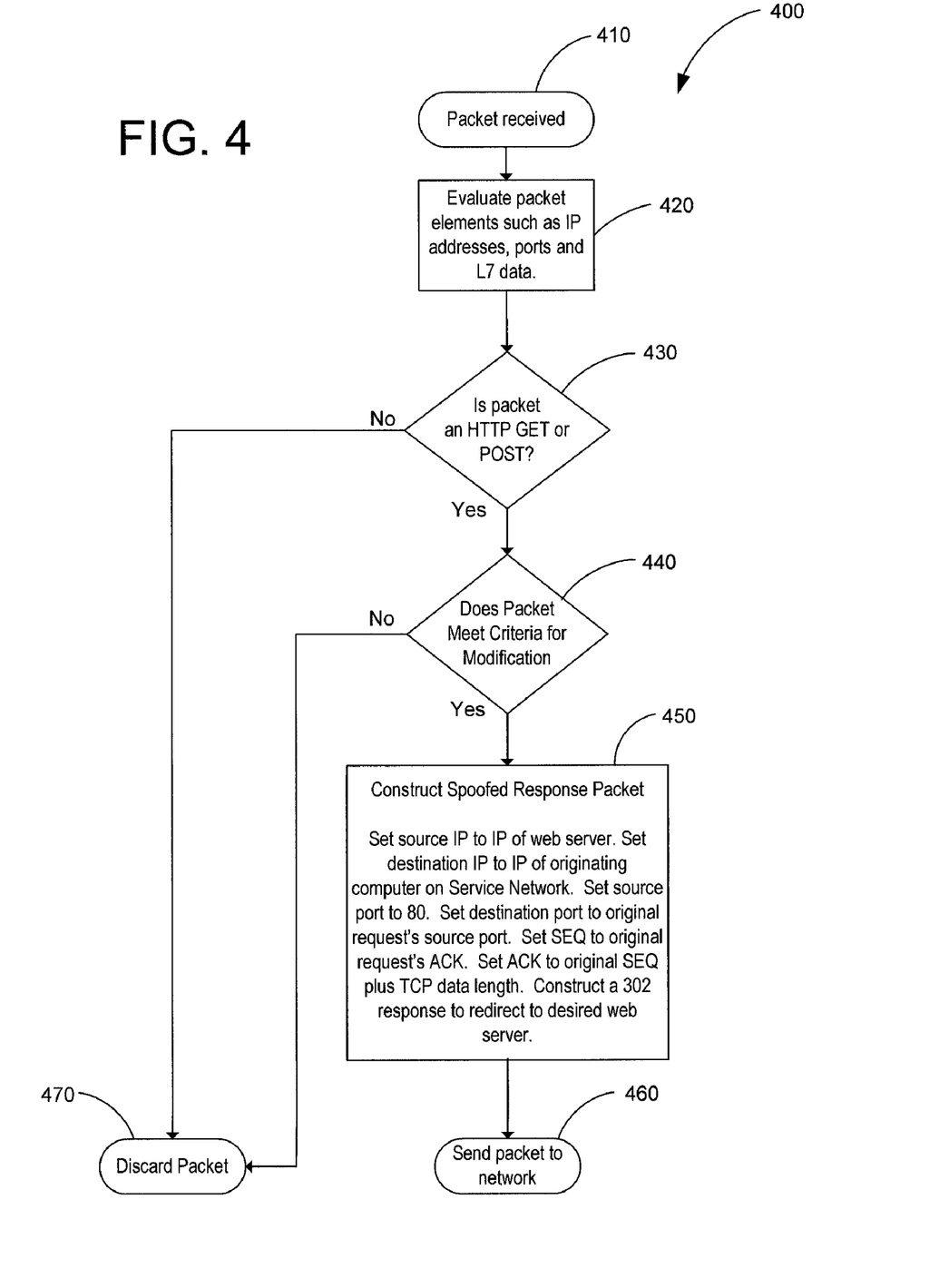
FIG. 4 depicts a flowchart illustrating a process of modifying http packets at a data center.

With reference to FIG. 4, a process 400 modifies the HTTP packets. At step 410, an HTTP packet is received by the content modification device 330. At step 420, the packet is examined to determine network elements such as IP addresses, ports, http or application header and data, or similar L7 data. At step 430, if the packet is an HTTP GET or POST request, the packet is sent to step 440. If the packet is neither a HTTP GET nor a HTTP POST, the packet is sent to step 470. At step 440, the packet is examined to determine if it meets criteria for HTTP modification. If the modification rules are met, the packet is pushed to step 450. If the rules are not met, the packet is sent to step 470. At step 450, a spoofed response packet is constructed according to the present invention. A 302 response to redirect to a desired web server is then encapsulated in the packet routing information and sent to step 460. At step 460, the spoofed packet is sent back onto the network to be delivered to the requestor. At step 470, the packet did not meet one of the modification criteria and is forwarded or discarded according to the network routing rules.

Figure 5:
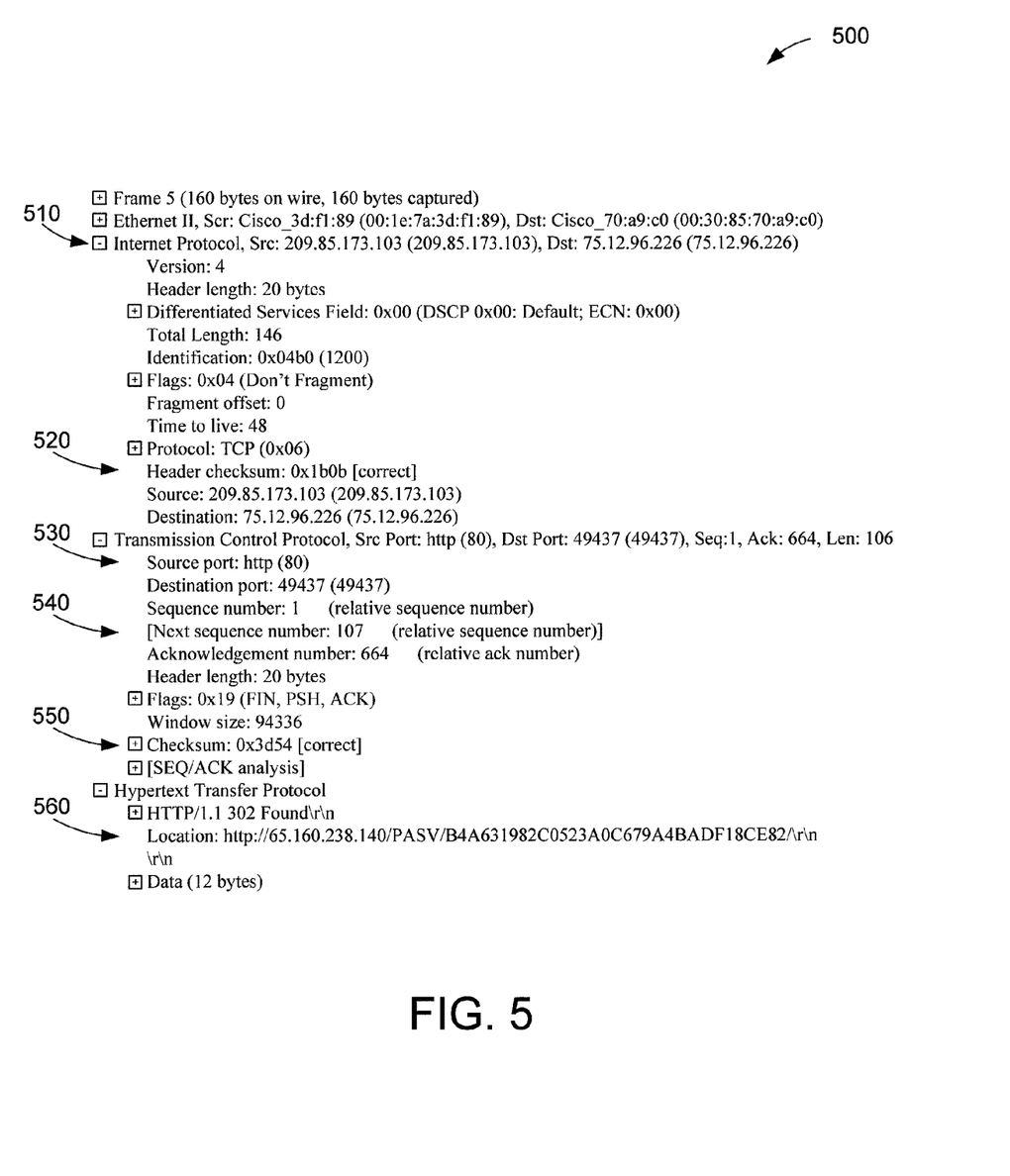
FIG. 5 depicts an exemplary replacement packet as generated by a content modification device.

FIG. 5 depicts an exemplary replacement packet 500 as generated by the content modification device 330. An IP header 510 is modified wherein the source address is the IP address of the server 250 that was the destination of the original request. The destination address is set to the IP address of the originating computer device 340. Other necessary IP headers 520 are modified such that options and checksum are properly set according to standard Internet Protocol (RFC 791). TCP headers 530 are modified wherein the source port is set to the port destined in the original request. The destination port is set to the source port of the original request. The TCP SEQ and ACK numbers 540 are modified wherein these values are set according to Transmission Control Protocol (RFC 675, et. al.). A TCP Checksum 550 is calculated according to standard Transmission Control Protocol. An HTTP response 560 is modified wherein a redirection to a different HTTP destination is sent to the user's computer causing the computer to generate a new HTTP request for this new content, completing the modification.

The present invention enables a service network 220 to utilize advanced content replacement and modification technologies without the need for expensive equipment to be installed at the site and without excessive packet redirection. It allows the data center 330 to provide a complete solution from a data center where costs of deployment, administration and maintenance may be minimal. Further, it provides for the use of revenue generation and service improvements to be provided to the service network. This is accomplished through a novel approach to filtering and mirroring packets from the service network to the content modification device and with the novel use of a content modification device 330 capable of replacing and modifying content.

FIG. 6 depicts an exemplary user database 600 located at a NSP (or, alternatively, it can be located off-site on a separate network) (which can be any one of the Network Service Providers 220.1-220.2) for storing user identification and participation information, in accordance with the present invention. Use of this database is optional, as noted in the description of FIG. 1.

The participant database 600 (which may run on a computer system of an NSP 220 as shown in FIG. 2) has four fields: 1) a Subscriber or User field, 610, containing the username (some NSPs could use this field for the user's IP address, Media Access Control—MAC address, or Global Unique Identifier—GUID, instead of a username); 2) a Participation field, 620, detailing whether the user is participating in the tracking; 3) a Location field, 630 containing the subscriber's location; and 4) an Attribute field, 640, that provides other known user information. The example shown in FIG. 6 uses the Attribute field to inform ANs and ITM companies (FIG. 2 240.1-241) that the User (FIG. 2, 211.1-212.N) is using wifi to connect to the Internet. Many attribute fields could be used, or none at all, depending upon the implementation of the invention.

FIG. 7 depicts an exemplary Web page database 700 located at a NSP (or, alternatively, it can be located off-site on a separate network) (which can be any one of the NSPs 220.1-220.2) for storing Web site participation information, in accordance with the present invention. Use of this database is optional, as noted in the description of FIG. 1.

The Web page database 700 (which may run on a computer system of an NSP 220 as shown in FIG. 2) has two fields: 1) a Web Page field, 710, containing the Web page name; and 2) an Eligibility field, 720, detailing whether the web page is eligible for insert.

Figure 8:
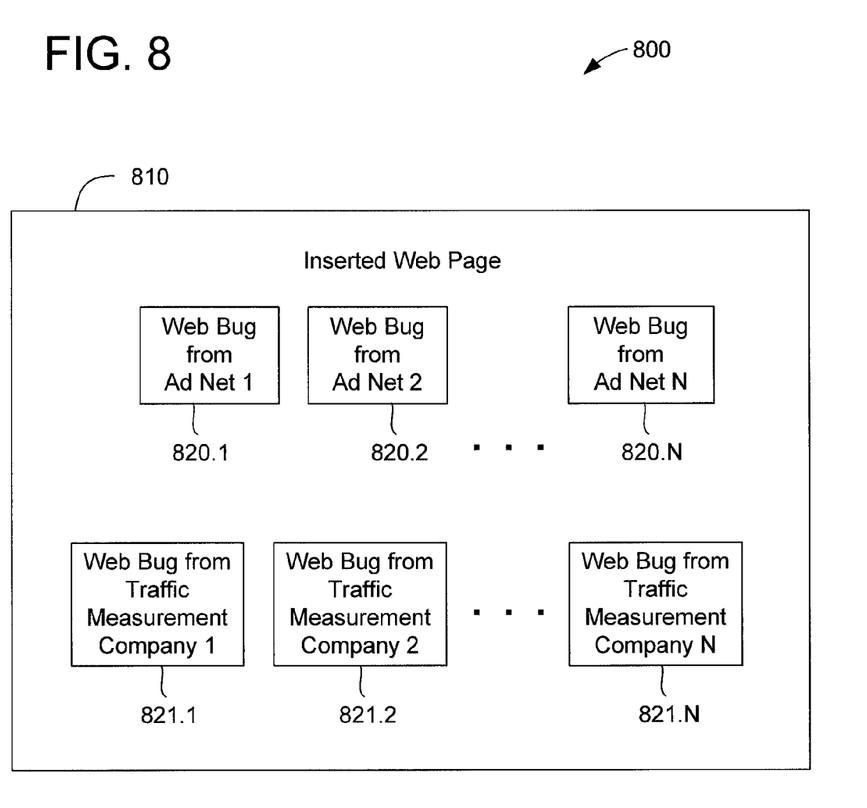
FIG. 8 depicts an exemplary inserted Web page created by the present invention.

FIG. 8 depicts a block diagram illustrating an exemplary inserted Web page 800, which includes Web bugs from one or more AN or ITM companies. As shown in FIG. 8, the inserted Web page 800 includes the Web bugs 820.1-820.N and 821.1-821.N (and FIG. 9, field 910) from one or more AN and ITM companies (FIG. 2, 220.1-221 .N). As noted before, the Web bugs could be alternatively inserted directly onto the originally requested Web page or into a frame.

Figure 9:
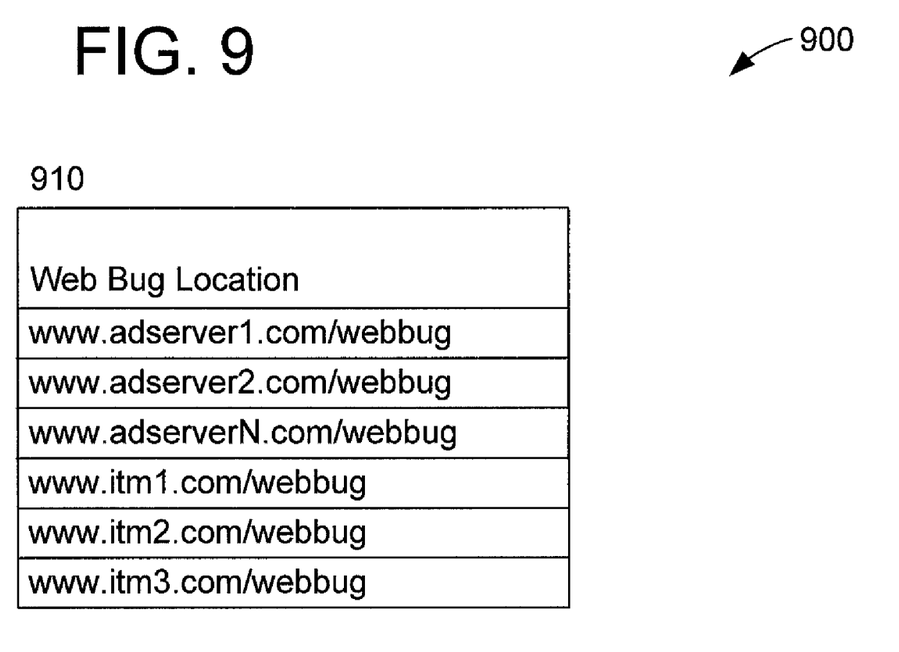
FIG. 9 depicts an exemplary Web bug database.

FIG. 9 depicts an exemplary user database 900 located at a NSP (or, alternatively, it can be located off-site on a separate network) (which can be any one of the NSPs 220.1-220.2) for storing the Web bug URL location information for participating AN and ITM companies, in accordance with the present invention. The Web bug location database 900 (which runs on a computer system) has one field: 1) a Web Bug Location field, 910, containing the URL of the Web bug.

Figure 10:
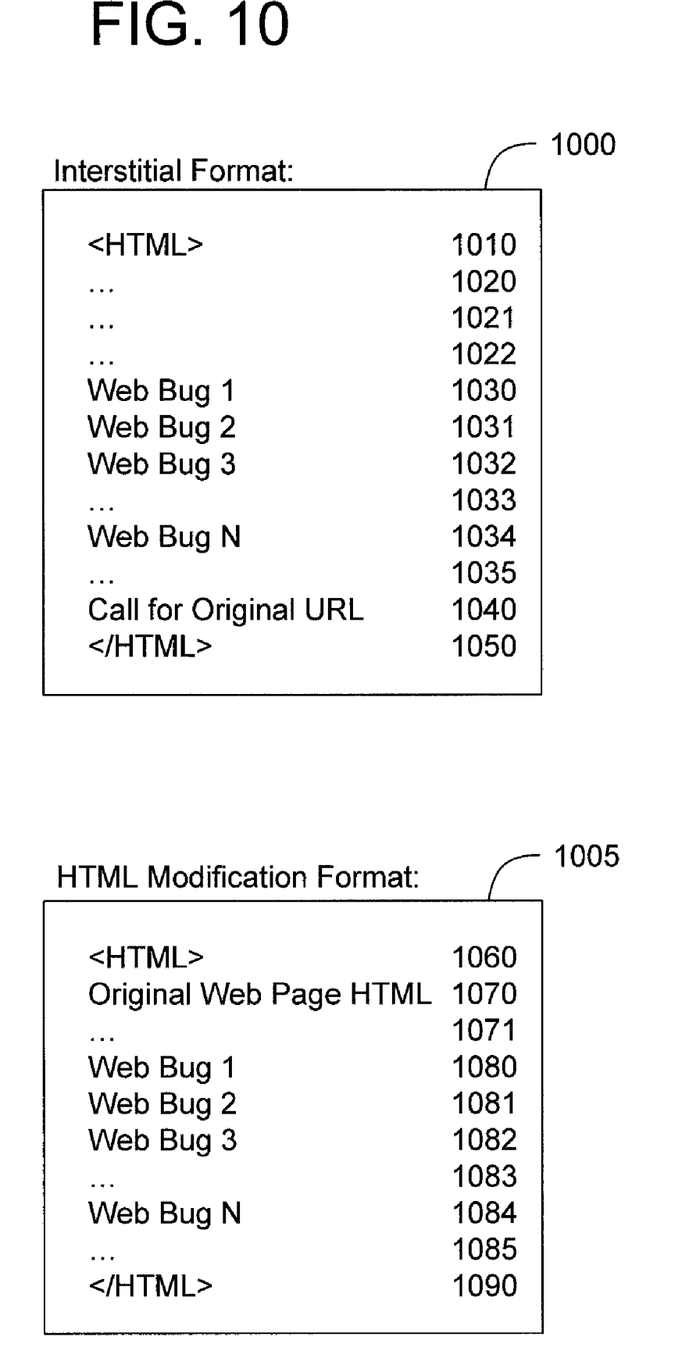
FIG. 10 depicts exemplary HTML code to insert Web bugs.

FIG. 10 depicts exemplary HTML code for inserting Web bugs onto either an inserted Web page 1000 or directly onto the originally requested Web page via a HTML modification format 1005. If the NSP opts to insert a Web page with Web bugs, it would follow the steps outlined in FIG. 10 from 1010-1050. Some of the steps could be taken in a different order than that which is shown below without impacting the overall functionality.

At step 1010, the HTML code would begin. At steps 1020-1022, various Web page elements would be created. At steps 1030-1034, various Web bugs would be placed on the inserted Web page. At step 1035, additional Web page code would be run. At step 1040, the originally requested URL would be called and the inserted Web page would disappear. At step 1050, the HTML would end.

If the NSP opts to modify the originally requested Web page, either by inserting Web bugs directly into the Web page or by inserting a frame, it would follow steps 1060-1090. At step 1060, the HTML code would begin. At step 1070, HTML from the originally requested Web page would be run. At step 1071, HTML various Web page elements would be created. At steps 1080-1084, Web bugs would be inserted onto the originally requested URL by appending this additional HTML code to the originally requested HTML code (step 1070). At step 1085, further HTML would be inserted as needed to facilitate the Web bug insertion process. At step 1090, the HTML would end.

Figure 11:
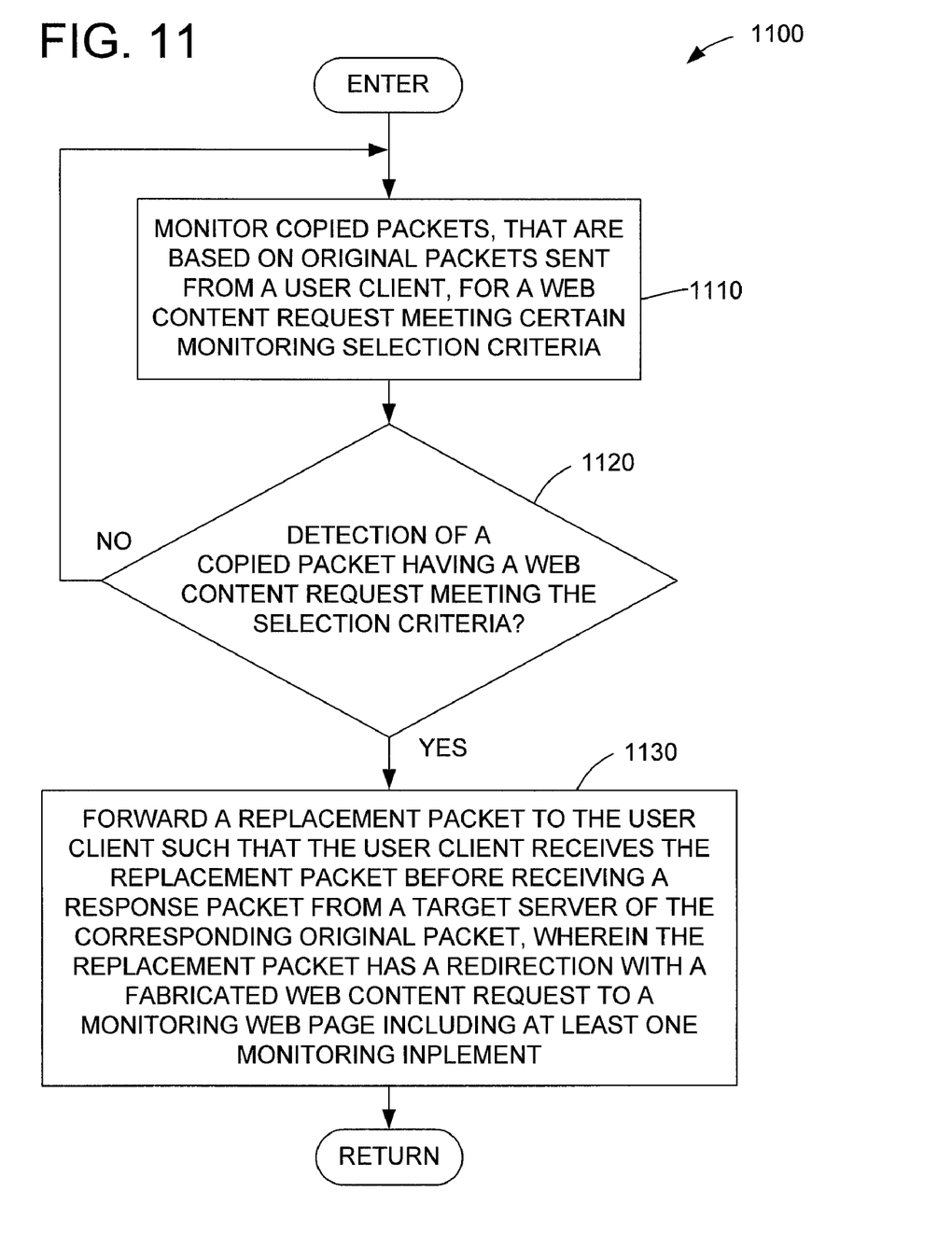
FIG. 11 depicts a flowchart illustrating an embodiment of an internet traffic monitoring method, according to the present invention.
Figure 12:
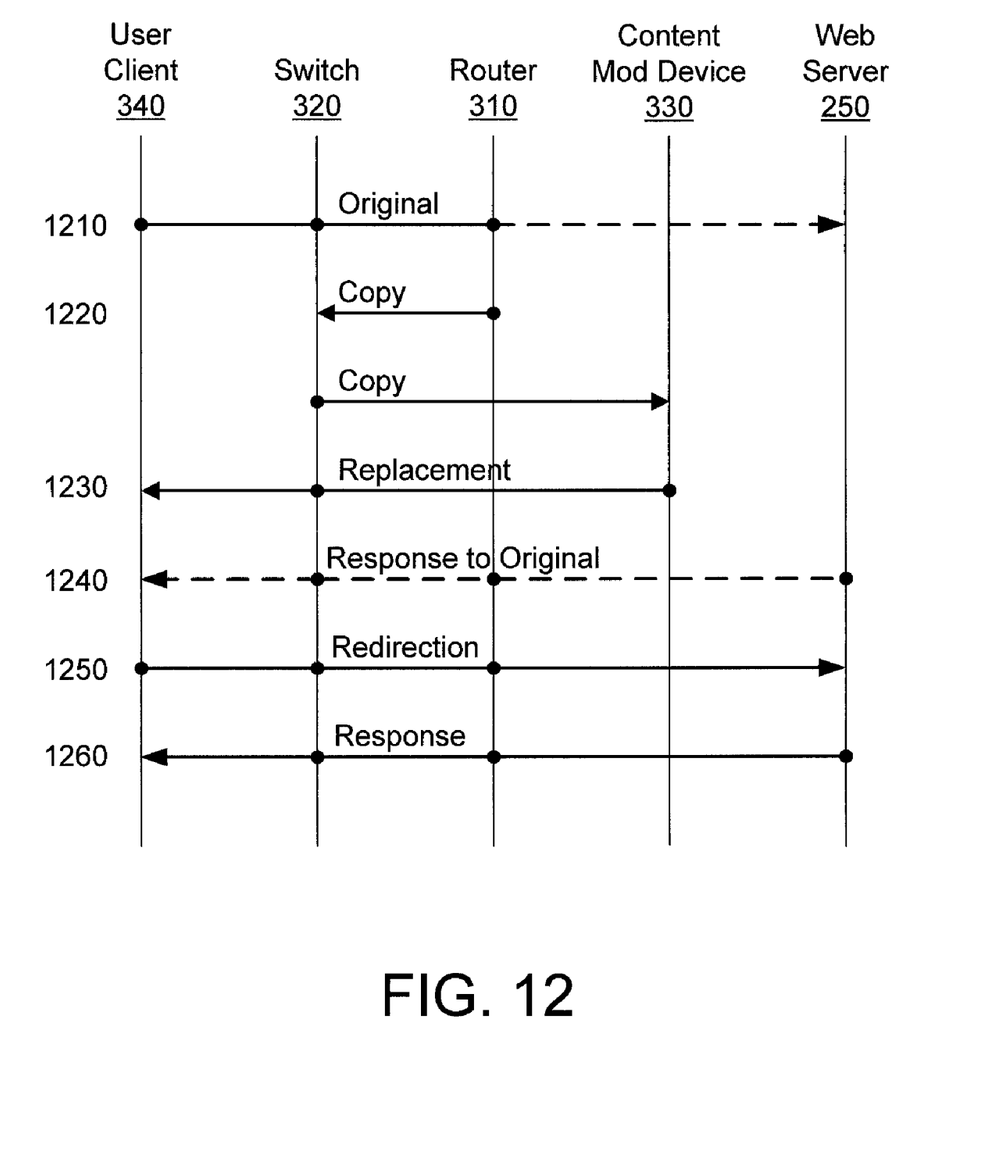
FIG. 12 depicts a schematic diagram illustrating transactions for internet traffic monitoring, according to the present invention.

With reference to FIGS. 11 and 12, the present invention may be embodied in an internet traffic monitoring method 1100. In the method, copied packets 1220 that are based on original packets 1210 sent from a user client 340 are monitored for a web content request meeting certain monitoring selection criteria (step 1110). Upon detection of a copied packet having a web content request meeting the selection criteria (step 1120), a replacement packet 1230 (500 in FIG. 5) is forwarded to the user client such that the user client receives the replacement packet before receiving a response packet 1240 from a target server 250 of the corresponding original packet (step 1130), wherein the replacement packet has a redirection 1250 with a fabricated web content request to a monitoring web page 800 including at least one monitoring implement 820 and 821. The user client receives a response 1260 with the fabricated web content based on the redirection.

In more detailed features of the invention, the web content request meeting the selection criteria may include search terms directed to an internet search engine, and the monitoring implement may cause the user client to forward the search terms to an associated advertisement selection service 240. The monitoring web page 800 may include at least two monitoring implements which are each associated with a separate advertisement selection service. The monitoring implements may comprise at least first and second web bugs 820 and 821. The first web bug may be referenced with a URL having embedded parameters related to the user associated with the user client 340. Alternatively, the monitoring implements may comprise at least first and second cookies.

In other more detailed features of the invention, the monitoring implements may comprise a web bug 820 or 821 associated with a first advertisement selection service 240, and a cookie associated with a second advertisement selection service. An advertisement selection service may select targeted advertising web content for presentation by the user client 340 based on at least one parameter from a monitoring implement included in a monitoring web page 800 presented as a result of traffic monitoring by a network service provider 220. Also, an advertisement selection service may select targeted advertising web content for presentation to the user client based on at least one parameter from a monitoring implement included in the monitoring web page which was presented as a result of traffic monitoring by a first network service provider 220.1, and based on at least one parameter from a monitoring implement included in another monitoring web page presented as a result of traffic monitoring by another network service provider 220.2 in response to a separate web content request. The monitoring web page may be an interstitial web page forwarded by the network service provider.

The present invention also may be embodied in an internet traffic monitoring system 300. The system may have means 330 for monitoring copied packets 1220, that are based on original packets 1210 sent from a user client 340, for a web content request meeting certain monitoring selection criteria; and means for forwarding a replacement packet 1230 to the user client, upon detection of a copied packet having a web content request meeting the selection criteria, such that the user client receives the replacement packet before receiving a response packet 1240 from a target server 250 of the corresponding original packet, wherein the replacement packet has a redirection 1250 with a fabricated web content request to a monitoring web page including at least one monitoring implement.

Alternatively, the present invention may be embodied in computer program product having computer readable medium including code for causing a computer to perform the method steps.

The present invention enables a NSP to send user information to participating ANs and ITMs. This is done by inserting a web page containing web bugs from participating ANs and ITMs before showing the originally requested web page. Web bugs on the inserted page capture URL information for the AN (such as an Ad Server AS) who then subsequently can tailor the ads they serve to users' interest as shown by the web pages they select and the searches they make. ITMs could use the invention in a similar fashion to track user web traffic. Common industry practice for web servers is to place their web bugs on many web sites, but with this invention, they can track user web traffic even on sites that don't have the AN's cookies already embedded on the web pages.

The present invention also may be embodied in an internet traffic monitoring system for a network service provider. The system may have means, such as a computer, for performing the method steps. Alternatively, the present invention may be embodied in computer program product having computer readable medium 222.1-222.2 including code for causing a computer to perform the method steps.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. An internet traffic monitoring method, comprising:
a content modification device monitoring copied packets for a web content request meeting certain monitoring selection criteria, wherein the content modification device receives the copied packets from a switched network of a network service provider, and wherein the copied packets are based on original packets sent from a user client to the internet; and
upon detection of a copied packet having a web content request meeting the selection criteria, the content modification device forwarding a replacement packet to the user client such that the user client receives the replacement packet before receiving a response packet from a target server of the corresponding original packet, wherein the replacement packet has a redirection with a fabricated web content request to a monitoring web page including at least one monitoring implement.

2. An internet traffic monitoring method as defined in claim 1, wherein the web content request meeting the selection criteria includes search terms directed to an internet search engine, and wherein the monitoring implement causes the user client to forward the search terms to an associated advertisement selection service.

3. An internet traffic monitoring method as defined in claim 1, wherein the monitoring web page includes at least two monitoring implements which are each associated with a separate advertisement selection service.

4. An internet traffic monitoring method as defined in claim 3, wherein the monitoring implements comprise at least first and second web bugs.

5. An internet traffic monitoring method as defined in claim 4, wherein the first web bug is referenced with a URL having embedded parameters related to the user associated with the user client.

6. An internet traffic monitoring method as defined in claim 3, wherein the monitoring implements comprise at least first and second cookies.

7. An internet traffic monitoring method as defined in claim 3, wherein the monitoring implements comprise a web bug associated with a first advertisement selection service, and a cookie associated with a second advertisement selection service.

8. An internet traffic monitoring method as defined in claim 1, wherein an advertisement selection service selects targeted advertising web content for presentation by the user client based on at least one parameter from a monitoring implement included in a monitoring web page presented as a result of traffic monitoring by a network service provider.

9. An internet traffic monitoring method as defined in claim 1, wherein an advertisement selection service selects targeted advertising web content for presentation to the user client based on at least one parameter from a monitoring implement included in the monitoring web page which was presented as a result of traffic monitoring by a first network service provider, and based on at least one parameter from a monitoring implement included in another monitoring web page presented as a result of traffic monitoring by another network service provider in response to a separate web content request.

10. An internet traffic monitoring method as defined in claim 1, wherein the monitoring web page is an interstitial web page.

11. An internet traffic monitoring hardware system, comprising:
means for monitoring copied packets for a web content request meeting certain monitoring selection criteria, wherein the content modification device receives the copied packets from a switched network of a network service provider, and wherein the copied packets are based on original packets sent from a user client to the internet; and
means for forwarding a replacement packet to the user client, upon detection of a copied packet having a web content request meeting the selection criteria, such that the user client receives the replacement packet before receiving a response packet from a target server of the corresponding original packet, wherein the replacement packet has a redirection with a fabricated web content request to a monitoring web page including at least one monitoring implement.

12. An internet traffic monitoring hardware system as defined in claim 11, wherein the web content request meeting the selection criteria includes search terms directed to an internet search engine, and wherein the monitoring implement causes the user client to forward the search terms to an associated advertisement selection service.

13. An internet traffic monitoring hardware system as defined in claim 11, wherein the monitoring web page includes at least two monitoring implements which are each associated with a separate advertisement selection service.

14. An internet traffic monitoring hardware system as defined in claim 13, wherein the monitoring implements comprise at least first and second web bugs.

15. An internet traffic monitoring hardware system as defined in claim 14, wherein the first web bug is referenced with a URL having embedded parameters related to the user associated with the user client.

16. An internet traffic monitoring hardware system as defined in claim 13, wherein the monitoring implements comprise at least first and second cookies.

17. An internet traffic monitoring hardware system as defined in claim 13, wherein the monitoring implements comprise a web bug associated with a first advertisement selection service, and a cookie associated with a second advertisement selection service.

18. An internet traffic monitoring hardware system as defined in claim 11, wherein the monitoring web page is an interstitial web page.

19. A computer program product, comprising:
  non-transitory computer readable medium including:
    code for causing a computer to monitor copied packets, that are based on original packets sent from a user client to the internet, for a web content request meeting certain monitoring selection criteria; and
    code for causing a computer to forward a replacement packet to the user client, upon detection of a copied packet having a web content request meeting the selection criteria, such that the user client receives the replacement packet before receiving a response packet from a target server of the corresponding original packet, wherein the replacement packet has a redirection with a fabricated web content request to a monitoring web page including at least one monitoring implement.

20. A computer program product as defined in claim 19, wherein the monitoring web page includes at least two monitoring implements which are each associated with a separate advertisement selection service.

21. A computer program product as defined in claim 20, wherein the monitoring implements comprise at least first and second web bugs.

22. A computer program product as defined in claim 21, wherein the first web bug is referenced with a URL having embedded parameters related to the user associated with the user client.

23. A computer program product as defined in claim 20, wherein the monitoring implements comprise at least first and second cookies.

24. A computer program product as defined in claim 20, wherein the monitoring implements comprise a web bug associated with a first advertisement selection service, and a cookie associated with a second advertisement selection service.

25. A computer program product as defined in claim 19, wherein the monitoring web page is an interstitial web page.

* * * * *